3,336,328
METAL COMPLEXES OF 2,6-DI-(2'-HYDROXY-ARYL)-(1,2d-4,5d)-BISOXAZOLE DERIVATIVES
Gustav Bock, Neustadt, Weinstrasse, Germany, assignor to Badische Anilin- & Soda-Fabrik Aktiengesellschaft, Ludwigshafen (Rhine), Germany,
No Drawing. Filed Jan. 3, 1966, Ser. No. 517,971
Claims priority, application Germany, Jan. 9, 1965, B 80,048; Nov. 20, 1965, B 84,588
6 Claims. (Cl. 260—299)

The present invention relates to new metal complex compounds and to a process for their production. The new metal complex compounds have the general formula

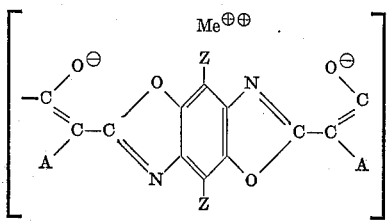

in which A denotes an unsubstituted or substituted divalent aromatic or heterocyclic radical which completes the portion of the molecule

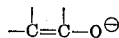

to form an aromatic or heterocyclic ring system, Z denotes a halogen atom or a radical having the general formula —X—R in which X denotes the bridging group —O—, —S— or —NH—CO— and R denotes a low molecular weight alkyl radical or an aryl radical which may bear alkyl groups, halogen atoms and/or a nitro group as substituents, and Me denotes a metal of groups IIA and IIB of the periodic system or copper, lead, manganese, iron, nickel or cobalt.

The new compounds are metal complexes of 2,6-di-(2'-hydroxyaryl)-benzo - [1,2d - 4,5d]bisoxazole derivatives. The manner in which these compounds are indicated in the above Formula I symbolizes in graphic form the salt character of the new metal complex compounds.

Owing to their insolubility in water and organic solvents and their very good fastness properties, these metal complex compounds are suitable as pigment dyes. Those pigment dyes having Formula I in which A completes the portion of the molecule

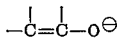

to form an aromatic six-membered ring are of particular industrial interest.

The new metal complex compounds may be obtained by treating 2,6-di-(2'-hydroxyaryl)-benzo-[1,2d-4,5d]-bisoxazoles having the general formula

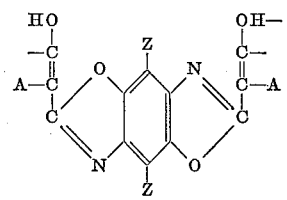

in which A and Z have the above meanings with compounds which yield the above-mentioned metals.

The bisoxazoles required as starting materials for the production of the new metal complex compounds are preferably prepared by heating a 2,5-diaminobenzoquinone containing the above-mentioned radical Z in 3,6-position in an organic solvent, if desired in the presence of an oxidizing agent, with about twice the molar amount of an aldehyde having the general formula

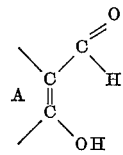

in which A has the above meaning, at temperatures of 130° to 200° C., preferably at 150° to 190° C. The radical Z in the benzoquinone may denote a halogen atom, preferably a chlorine atom or bromine atom, or the above-mentioned radical —X—R, examples of which are the following radicals: methoxy, other alkoxy, phenoxy, phenylmercapto, acetylamino, nitrophenoxy, chlorophenoxy, methylphenoxy and chlorophenylmercapto. The aldehydes having the above-mentioned formula are aromatic or heterocyclic aldehydes which, in addition to the hydroxy group in ortho-position to the formyl group, may bear substituents, such as halogen atoms, alkyl groups having one to four carbon atoms, for example methyl groups or ethyl groups, nitro groups, hydroxy groups or arylazo groups which in turn may bear substituents in the aryl radical. The said aldehydes may be derived from mononuclear aromatic or heterocyclic compounds but may also consist of more highly condensed aromatic or aromatic heterocyclic ring systems.

In the preferred method of preparing the starting materials, the said 2,5-diaminobenzoquinones are heated with about twice the molar amount of an aldehyde of the said type in an organic solvent at temperatures of 130° to 200° C., preferably at 150° to 190° C. Examples of suitable organic solvents are high boiling point organic solvents, such as dichlorobenzene, nitrobenzene, N-methylpyrrolidone or dimethylformamide; they may also be used mixed together. A mixture of 10 parts by weight of N-methylpyrrolidone and 90 parts of nitrobenzene is particularly suitable for example. It is advantageous to use from ten to twenty times the amount of a solvent or mixture of solvents, with reference to the quinone. Under the said conditions, condensation takes place to form the 2,6-di-(2'-hydroxyaryl)-benzo - [1,2d - 4,5d] - bisoxazole compounds which have not been described hitherto. The course of this reaction, for example when starting from 2,5-diamino-3,6-dichlorobenzoquinone and using 3,5-dichlorosalicyl aldehyde as the aldehyde, may be represented by the following equation:

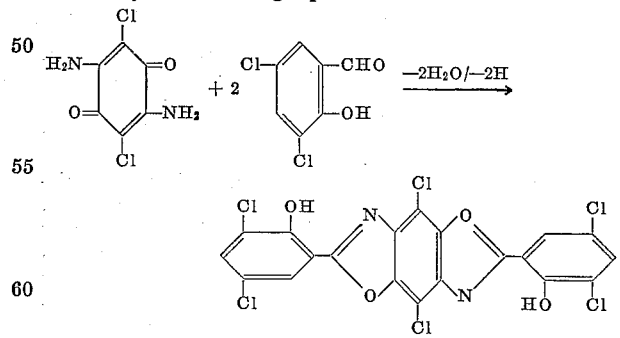

It will be seen that the reaction includes a dehydrogenation. The reaction is therefore advantageously carried out in the oxidizing solvent nitrobenzene or in the presence of other oxidizing agents, such as atmospheric oxygen or chloranil. The bisoxazoles may be treated with nitrating agents prior to metallization. Nitro groups are thus introduced into the aryl radical. Nitration may be carried out for example by treating the oxazole derivative in sulfuric acid with nitric acid at temperatures of 20° to 100° C.

To carry out the process according to this invention, the bisoxazoles (obtainable by the said reaction of 2,5-diaminobenzoquinone and the aldehydes, and if desired nitrated) are metallized by conventional methods. Compounds of metals of groups IIA and IIB of the periodic system or those which yield copper, lead, manganese, iron, nickel or cobalt may be used as the agents yielding metal. Examples of such compounds are the salts of weak acids, such as the acetates, formates, or carbonates. Mixtures of these salts, which may also contain different metals from the above range, may also be used. Mixed complexes are thus obtained. Metallization products which contain less metal, for example 99 to 20 mole percent, or more metal, for example 101 to 150 mole percent, per mole of bisoxazole are also well suited as pigments.

Metallization may be carried out for example by heating a solution or suspension of the sparingly soluble bisoxazole in a polar solvent, for example an alcohol, such as ethylene glycol, or a carboxylic amide, such as dimethylformamide or formamide, or a mixture of polar solvents with nonpolar solvents, with a solution of the metal-supplying compound of the said type in the same solvent or in water or in aqueous ammonia at temperatures of 50° to 200° C. Metallization may also be carried out by heating a suspension, as finely divided as possible, of the bisoxazole in water with one of the metal supplying agents, if desired under pressure.

Metal complex compounds obtainable by the process according to this invention are yellow to red pigment dyes having very good fastness properties. For example the metal complex compounds of 2,6-di-(2'-hydroxy-3,5-dichlorophenyl)-4,8-dichlorobenzo-[1,2d-4,5d] - bisoxazole are greenish yellow to intense reddish yellow pigments, like the corresponding nickel complex which is a bright reddish yellow pigment distinguished by its outstanding fastness properties, particularly by very good fastness to light and stability to acids. The nickel complex of 2,6-di-(2' - hydroxy - 5' - bromophenyl) - 4,8 - dichlorobenzo-[1,2d-4,5d]-bisoxazole is an intense greenish yellow pigment. The metal complexes of 2,6-di-(2'-hydroxynaphthyl-1')-4,8-dichlorobenzo-[1,2d-4,5d]-bisoxazole and 2,6-di - (2',4' - dihydroxyquinolyl-1') - 4,8 - dichlorobenzo-[1,2d-4,5d]-bisoxazole are yellow to red orange pigments, while the metal complexes of 2,6-di-(2'-hydroxy-5-phenylazophenyl)-4,8-dichlorobenzo-[1,2d-4,5d]-bisoxazoles are orange to red pigments.

By using different metal ions it is possible to prepare mixed complexes with which desired effects may be achieved as compared with the pure complexes. For example if a portion of the nickel in the nickel complex of 2,6-di-(2'-hydroxy - 3,5 - dichlorophenyl) - 4,8 - dichlorobenzo-[1,2d-4,5d]-bisoxazole be replaced by barium, a greenish yellow pigment is obtained, whereas with copper a stronger displacement toward orange is achieved. Adding manganese, without causing appreciable displacement of the shade of color, causes an increase in the mean primary particle size so that pigments having better covering power are obtained.

The new metal complex compounds may be used as pigments in the form of, for example, pastes, flush pastes, formulations, printing inks, distempers, binder colors or lacquers of all types. They may also be used for pigmenting synthetic, semisynthetic or natural macromolecular substances, such as polyvinyl chloride, polystyrene, polyethylene, polyesters, phenoplasts, aminoplasts and rubber. The pigments may also be used for coloring regenerated or artificial fibers, such as glass, silicate, asbestos, wood, cellulose, acetyl cellulose, polyacrylonitrile, polyester, polyurethane and polyvinyl chloride fibers or mixtures of the same, and also for coloring powders, such as stone dust, cements, gypsum, starch and wood flour. Prints, lacquerings, coatings, paints, and molded articles, such as films, sheeting, filaments, plates, blocks, granulates and rods having a bright yellow to red color having outstanding durability are obtained with the new pigments.

The new metal complex compounds are used as pigment dyes according to the knowledge and requirements of the pigment art. They may be used in the form in which they are formed by synthesis but they may also be brought into a finely divided form by grinding with conventional grinding equipment and by conventional methods. After having been ground, they may be subjected to recrystallization, for example by heating them with polar solvents, as for example high boiling point alcohols, dimethylsulfoxide, dimethylformamide, N-methylpyrrolidone or mixtures of the same with other solvents and/or water until they have the desired particle size. Pigments are preferred which have a particle size of from 0.05 to 2 microns.

The invention is illustrated by the following examples in which parts and percentages are by weight.

*Example 1*

103 parts of 2,5-diamino-3,6-dichlorobenzoquinone and 200 parts of 3,5-dichlorosalicyl aldehyde are heated to 190° C. in 900 parts of nitrobenzene and 100 parts of N-methylpyrrolidone-(2), water being distilled off from 180° C. The whole is heated for six hours at 190° to 200° C., cooled and the deposited crystals are suction filtered. They are washed with acetone and dried. 232 parts of 2,6-di-(2'-hydroxy-3',5'-dichlorophenyl)-4,8-dichlorobenzo-[1,2d-4,5d]-bisoxazole is obtained in the form of light brownish crystals having a melting point of more than 300° C.

*Analysis.*—Calculated for $C_{20}H_6Cl_6N_2O_4$ (551): C, 43.6; H, 1.4; N, 5.1; Cl 38.3. Found: C, 43.4; H, 1.5; N, 5.1; Cl 36.9.

To purify the substance it is dissolved in twenty times its weight of concentrated sulfuric acid at 50° to 70° C. and the clear solution is freed from impurities by suction filtration through a porcelain filter. The solution is then diluted to a sulfuric acid content of 90% and the deposited crystals are suction filtered. The crystals are washed with water until sulfate ions are absent and dried. Almost colorless crystals are obtained in a yield of about 90% of the theory.

5 parts of 2,6-di-(2'-hydroxy-3',5'-dichlorophenyl)-4,8-dichlorobenzo-[1,2d-4,5d]-bisoxazole is suspended in 50 parts of dimethylformamide. A solution of 2 parts of nickel acetate in 20 parts of formamide is added to this suspension. The mixture is heated at 120° C. for three hours. The whole is cooled to 80° C. and the yellow crystals are suction filtered. They are washed with water until nickel ions are absent and dried. 4.9 parts of a pigment is obtained in the form of a yellow crystal powder which does not melt up to 300° C.

*Analysis.*—Calculated for $C_{20}H_6Cl_2N_2O_4Ni$ (605): 9.7. Found: Ni, 9.6.

If the same reaction be carried out in ethylene glycol, a more strongly reddish yellow pigment is obtained. The pigment has the formula:

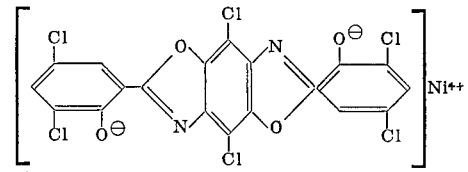

20 parts of this pigment and 20 parts of aluminum hydroxide are ground with 60 parts of linseed oil varnish on a three roll mill in the usual way. With the resultant printing ink, brilliant yellow prints having very good fastness properties, particularly good light fastness, are obtained by book printing and offset printing methods.

*Example 2*

50 parts of 2,6-di-(2'-hydroxy-3',5'-dichlorophenyl)-4,8-dichlorobenzo-[1,2d-4,5d]-bisoxazole obtainable according to Example 1 is suspended in 500 parts of dimethylformamide and 200 parts of water. 4 parts of nickel acetate and 15 parts of barium acetate are added and the whole is heated for two hours at 110° C. while distilling off part of the water. The whole is cooled to 80° C., suction filtered and the yellow crystals are washed until they are free from metal ions. 55 parts of pigment is obtained in the form of a yellow crystal powder.

*Analysis.*—Calculated for $C_{20}H_6Cl_6N_2O_4(Ba_{0.7}Ni_{0.3})$ (663): Ba, 14.5; Ni, 2.7. Found: Ba, 12.5; Ni, 1.8.

16 parts of this pigment is ground in a cone mill or ball mill with a stoving lacquer consisting of coconut alkyd resin (40% of coconut oil), 24 parts of urea-formaldehyde resin, 80 parts of xylene and 16 parts of n-butanol. Using this lacquer, bright yellow lacquerings may be prepared which after curing by stoving are highly glossy and have excellent fastness to weathering and overlacquering.

Example 3

2,5-diamino-3,6-dichlorobenzoquinone is reacted with 5-bromo-salicylaldehyde according to the method given in the first paragraph of Example 1 so that 2,6-di-(2'-hydroxy - 5' - bromophenyl) - 4,8 - dichlorobenzo - [1,2d-4,5d]-bisoxazole is obtained. 5 parts of this compound is suspended in 50 parts of ethylene glycol. A solution of 2 parts of cobalt acetate in 20 parts of formamide is added to this suspension. The mixture is heated for four hours at 130° to 140° C., cooled to 60° C. and the reddish yellow crystals are suction filtered. They are washed with water until metal ions are absent and then dried. 5.2 parts of a pigment is obtained in the form of a reddish yellow crystal powder.

*Analysis.*—Calculated for $C_{20}H_6Br_6Cl_2N_2O_4Co$ (629): 9.4. Found: Co, 9.8. The pigment has the formula:

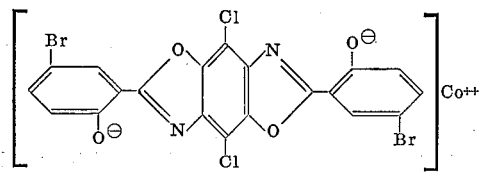

A mixture of 70 parts of polyvinyl chloride, 30 parts of dibutyl phthalate and 1 part of titanium dioxide is colored in the usual way with 0.5 part of the pigment obtained according to the first paragraph of this example on mixing rollers heated to 160° C. A reddish yellow product is obtained from which sheeting and sections may be prepared. The coloring is characterized by high fastness to plasticizers and outstanding fastness to light.

Example 4

20 parst of the 2,6-di-(2'-hydroxy-5'-bromophenyl)-4,8-dichlorobenzo-[1,2d-4,5d]-bisoxazole described in Example 3 is dissloved in 150 parts of concentrated sulfuric acid at 50° C. and 10 parts of 65% nitric acid is dripped into this solution at the same temperature. The whole is then kept at 50° C. for one hour, cooled to 20° and the reaction mixture is diluted with water until the sulfuric acid content is 80%. The deposited crystals are suction filtered and washed with water until sulfate ions are absent and then dried. 19 parts of 2,6-di-(2'-hydroxy-3'-nitro - 5' - bromophenyl) - 4,8 - dichlorobenzo - [1,2d-4,5d]-bisoxazole is obtained in the form of yellow crystals having a melting point above 300° C.

*Analysis.*—Calculated for $C_{20}H_6Br_2Cl_2N_4O_8$ (661): C, 36.3; H, 0.9; N, 8.4; Cl, 10.7; Br, 24.2. Found: C, 37.2; H, 1.2; N, 7.9; Cl, 10.7; Br, 24.2.

5 parts of the bisoxazole thus prepared is heated with 2 parts of cobalt acetate in 50 parts of dimethylformamide and 10 parts of dichlorobenzene for four hours at 150° C. The whole is then cooled, suction filtered, washed with water until metal ions are absent and dried. 4.8 parts of a pigment is obtained in the form of an orange crystal powder.

*Analysis.*—Calculated for $C_{20}H_4Br_2Cl_2N_4O_8Co$ (718): 8.2%. Found: 7.9%. The pigment has the formula:

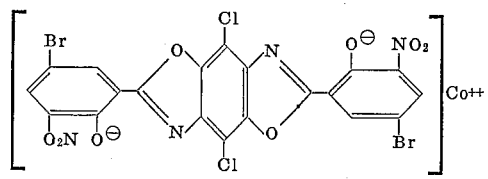

Example 5

By the process described in paragraph 1 of Example 1, 2,6 - di - (2' - hydroxynaphthyl - 1') - 4,8 - dichlorobenzo-[1,2d-4,5d]-bisoxazole is obtained in the form of yellow crystals having a melting point above 300° C. from 2,5-diamino-3,6-dichlorobenzoquinone and 2-hydroxy-1-naphthaldehyde.

*Analysis.*—Calculated for $C_{28}H_{14}Cl_2N_2O_4$ (513): C, 65.5; H, 2.7; Cl, 13.9; N, 5.5. Found: C, 65.2; H, 2.9; Cl, 12.5; N, 5.6.

5 parts of this compound is heated with 2 parts of nickel acetate in 50 parts of N-methylpyrrolidone for two hours at 180° C. The reaction mixture is cooled to 60° C. The deposited yellow crystals are suction filtered, washed with water until metal ions are absent and dried. 4.8 parts of a yellow crystal powder is obtained which does not melt at 300° C. The yellow pigment has the formula:

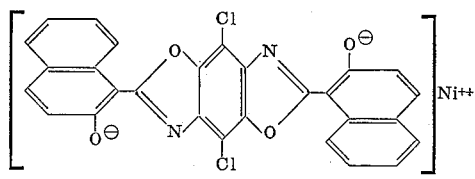

*Analysis.* — Calculated for $C_{28}H_{12}Cl_2N_2O_4Ni$ (570): 10.3%. Found: Ni, 10.1%.

The following procedure may however be followed for the production of a yellow pigment.

10 parts of the bisoxazole is suspended in 100 parts of concentrated sulfuric acid and stirred for six hours at 20° C. The crystals which separate thereafter are suction filtered, washed first with 20 parts of concentrated sulfuric acid and then with water until the bulk of the sulfuric acid has been removed. The moist filter cake obtained is suspended in 300 parts of water. An aqueous ammonia solution is added to the suspension until there is a clear alkaline reaction and then 2 parts of nickel acetate is added. The reaction mixture is then boiled for four hours while distilling off the excess ammonia, and then cooled. The yellow crystals are sucked off, washed with water until sulfate ions and metal ions are absent and dried. 8 parts of a yellow crystal powder is obtained.

*Analysis.*—Found, Ni, 5.7%. The incompletely metallized product of the bisoxazole having the above formula is also a beautiful bright yellow pigment having good fastness properties.

The following pigments which are obtained by methods analogous to those described in Examples 1 to 5 may be given as further examples.

Example 6

The nickel complex of 2,6-di-(2'-hydroxyphenyl)-4,8-dichlorobenzo-[1,2d-4,5d]-bisoxazole, pale yellow crystals having a melting point above 300° C.

Example 7

The nickel complex of 2,6-di-(2'-hydroxy-4'-phenyl-azophenyl)-4,8-dichlorobenzo-[1,2d-4,5d]-bisoxazole; red orange crystals, melting point above 300° C.

Example 8

The cobalt complex of 2,6-di-[2'-hydroxy-4'-(4-nitro-phenylazo) - phenyl] - 4,8 - dichlorobenzo - [1,2d-4,5d]-bisoxazole; red crystals, melting point above 300° C.

Example 9

The cadmium complex of 2,6-di-(2',4'-dihydroxyquinolyl-3')-4,8-dichlorobenzo-[1,2d-4,5d]-bisoxazole; orange crystals, melting point above 300° C.

Example 10

The nickel complex of 2,6-di-(2'-hydroxy-3',5'-dichlorophenyl) - 4,8 - dibromobenzo - [1,2d-4,5d] - bisoxazole; reddish yellow crystals, melting point above 300° C.

Example 11

32 parts of 2,5-diamino-3,6-dimethoxybenzoquinone and 64 parts of 3,5-dichlorosalicylaldehyde are heated in 180 parts of nitrobenzene and 20 parts of N-methylpyrrolidone-(2) to 190° C., water being distilled off from 180° C. The whole is heated for two hours at 190° to 200° C., cooled and the deposited crystals are suction filtered. They are washed with acetone and dried. 53 parts of 2,6 - di - (2'-hydroxy - 3',5' - dichlorophenyl)-4,8-dimethoxybenzo-[1,2d-4,5d]-bisoxazole is obtained as pale brownish crystals, melting point above 300° C.

*Analysis.*—Calculated for $C_{22}H_{12}Cl_4N_2O_6$ (542): C, 48.7; H, 2.2; N, 5.2; Cl, 26.2. Found: C, 48.5; H, 2.3; N, 5.1; Cl, 25.9.

To purify the substance it is treated as described in the second paragraph of Example 1. Almost colorless crystals are obtained in a yield of about 90% of the theory.

5 parts of 2,6-di-(2'-hydroxy-3',5'-dichlorophenyl)-4,8-dimethoxybenzo-[1,2d-4,5d]-bisoxazole is suspended in 50 parts of dimethylformamide. A solution of 3 parts of nickel acetate in 20 parts of formamide is added to this suspension. The mixture is heated at 120° C. for three hours. It is then cooled to 80° C. and the yellow crystals are suction filtered, washed with water until nickel ions are no longer present and dried. 5.3 parts of a pigment is obtained in the form of a yellow crystal powder which does not melt up to 300° C.

*Analysis.* — Calculated for $C_{22}H_{10}Cl_4N_2O_6Ni$ (599): 9.8%. Found: Ni, 9.8%.

If the same reaction be carried out in ethylene glycol, a more strongly reddish yellow pigment is obtained. The pigment has the formula:

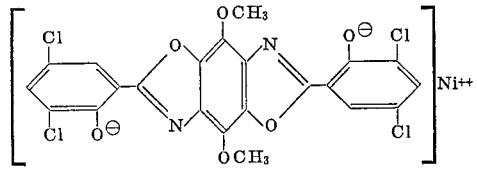

20 parts of this yellow pigment and 20 parts of aluminum hydroxide are ground on a three roll mill in the usual way with 60 parts linseed oil varnish. Bright yellow prints having very good fastness properties and in particular good light fastness, are obtained with the resultant printing ink in book printing and offset printing methods.

Example 12

50 parts of 2,6-di-(2'-hydroxy-3',5'-dichlorophenyl)-4,8-dimethoxybenzo-[1,2d-4,5d]-bisoxazole, obtainable according to Example 11, is suspended in 500 parts of dimethylformamide and 200 parts of water. 30 parts of cobalt acetate is added and the whole is heated to 110° C. for two hours while distilling off part of the water. It is then cooled to 80° C., suction filtered and the orange crystals are washed until there are no metal ions present. 54 parts of a pigment is obtained in the form of an orange yellow crystal powder.

*Analysis.*—Calculated for $C_{22}H_{10}Cl_4N_2O_6Co$ (599): Co, 9.8%. Found: Co, 9.9%.

16 parts of this pigment is ground on a cone mill or ball mill with a baking lacquer consisting of coconut alkyd resin (40% coconut oil), 24 parts of urea-formaldehyde resin, 80 parts of xylene and 16 parts of n-butanol. Bright yellow lacquerings may be prepared with the lacquer; after they have been cured by baking, they are highly glossy and have outstanding resistance to weathering and over-lacquering.

The following pigments may be given as further examples of those obtainable by the method described in Example 11 or Example 12.

Example 13

The nickel complex of 2,6-di-(2'-hydroxy-3',5'-dichlorophenyl)-4,8-diethoxybenzo-[1,2d-4,5d]-bisoxazole; yellow crystals, melting point above 300° C.

Example 14

The nickel complex of 2,6-di-(2'-hydroxy-3',5'-dichlorophenyl)-4,8-diphenoxybenzo-[1,2d - 4,5d] - bisoxazole; yellow crystals, melting point above 300° C.

Example 15

The zinc complex of 2,6-di-(2'-hydroxy-3',5'-dichlorophenyl)-4,8-diphenylmercaptobenzo - [1,2d - 4,5d] - bisoxazole; orange crystals, melting point above 300° C.

Example 16

The nickel complex of 2,6-di-(2'-hydroxy-3',5'-dichlorophenyl)-4,8 - diacetylaminobenzo - [1,2d-4,5d]-bisoxazole; orange crystals, melting point above 300° C.

I claim:

1. A metal complex compound having the general formula

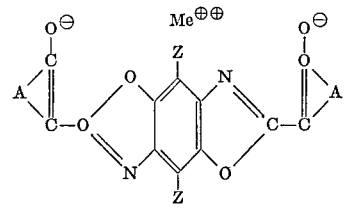

in which A denotes a divalent radical which completes the portion of the molecule

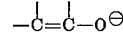

to form an aromatic hydrocarbon ring having 6 or 10 ring carbon atoms, which ring is substituted with 0–2 members selected from the group consisting of chloro, bromo, alkyl with 1–4 carbon atoms, nitro, hydroxy, phenylazo, and nitrophenylazo or the heterocyclic ring corresponding to 2,4-dihydroxyquinolyl-3, Z denotes a —Cl, Br, —OCH₃, —OC₂H₅, —OC₆H₅, —SC₆H₅, —NHCOCH₃, —OC₆H₄NO₂, —OC₆H₄Cl, —OC₆H₄CH₃, or —SC₆H₄Cl and Me denotes a metal of group IIA or IIB of the periodic system or copper, lead, manganese, iron, nickel or cobalt.

2. The metal complex compound having the formula

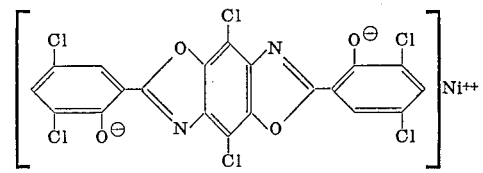

3. The metal complex compound having the formula

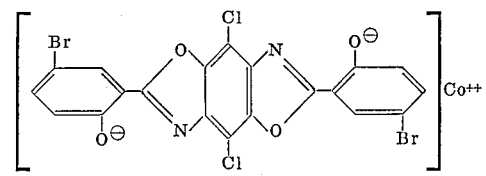

4. The metal complex compound having the formula
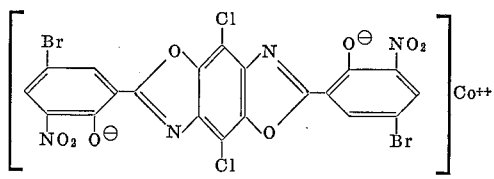
5. The metal complex compound having the formula
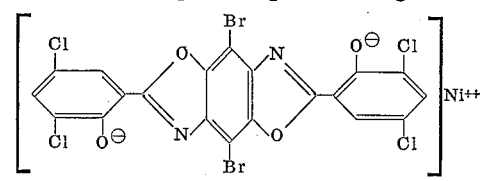
6. The metal complex compound having the formula
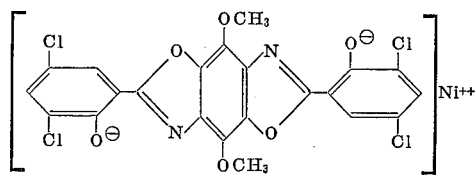
No references cited.
ALEX MAZEL, *Primary Examiner.*
RICHARD J. GALLAGHER, *Assistant Examiner.*

UNITED STATES PATENT OFFICE
CERTIFICATE OF CORRECTION

Patent No. 3,336,328                      August 15, 1967

Gustav Bock

It is hereby certified that error appears in the above numbered patent requiring correction and that the said Letters Patent should read as corrected below.

Column 1, lines 57 to 64, for the upper right-hand portion of the formula reading

      read      

column 5, line 53, for "parst" read -- parts --; column 8, lines 30 to 39, for the left-hand portion of the formula reading

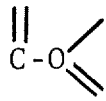      read      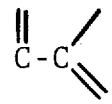

same column, same lines 30 to 39, for the upper right-hand portion of the formula reading

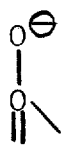      read      

Signed and sealed this 11th day of February 1969.

(SEAL)
Attest:

EDWARD M. FLETCHER, JR.                  EDWARD J. BRENNER
Attesting Officer                        Commissioner of Patents